United States Patent [19]
Kozleski

[11] Patent Number: 5,764,152
[45] Date of Patent: Jun. 9, 1998

[54] SOLENOID ENERGIZATION INDICATOR WITH HOLD-DOWN MEMBER FOR RECEIVING BOBBIN ASSEMBLY TO ROTATABLY ADJUSTING THE LAMP POSITION

[75] Inventor: Albert L. Kozleski, Lake Orion, Mich.

[73] Assignee: Detroit Coil Company, Ferndale, Mich.

[21] Appl. No.: 790,955

[22] Filed: Jan. 29, 1997

[51] Int. Cl.$^6$ ................................................. G08B 21/00
[52] U.S. Cl. .................... 340/644; 251/129; 251/120; 239/585
[58] Field of Search ............................ 340/644, 635, 340/638, 653, 654, 664; 335/2, 17, 52, 113; 324/145, 156

[56] References Cited

U.S. PATENT DOCUMENTS

| | | | |
|---|---|---|---|
| 2,591,336 | 4/1952 | Bordelon | 200/111 |
| 2,611,843 | 9/1952 | Bourne | 200/87 |
| 3,028,587 | 4/1962 | Vaccaro | 340/252 |
| 3,316,447 | 4/1967 | Hochstein | 315/206 |
| 3,488,681 | 1/1970 | Harper | 335/170 |
| 3,598,360 | 8/1971 | Merriner | 251/129 |
| 3,731,881 | 5/1973 | Dixon et al. | 239/585 |
| 3,909,670 | 9/1975 | Wakamatsu et al. | 315/276 |
| 4,259,545 | 3/1981 | Hayden | 174/139 |
| 4,342,973 | 8/1982 | Stone et al. | 335/2 |
| 4,558,310 | 12/1985 | McAllise | 340/661 |
| 4,621,788 | 11/1986 | DeLew et al. | 251/120 |
| 5,015,944 | 5/1991 | Bubash | 324/127 |
| 5,287,087 | 2/1994 | Jencks et al. | 340/644 |

Primary Examiner—Jeffery A. Hofsass
Assistant Examiner—Toan N. Pham
Attorney, Agent, or Firm—Brooks & Kushman P.C.

[57] ABSTRACT

An energization indicator for a solenoid includes an electrically operable signaler (70) having a coil (72) for energizing the signaler (70) when a magnetic flux field sweeps such coil, with the coil (72) being mounted in the magnetic flux path of the solenoid coil. The indicator includes the hold-down member (116) for rotatable positioning of the bobbin assembly on the hold-down member independently of the rotated position of the hold-down member to locate the lamp as desired on the solenoid.

5 Claims, 2 Drawing Sheets

SOLENOID ENERGIZATION INDICATOR WITH HOLD-DOWN MEMBER FOR RECEIVING BOBBIN ASSEMBLY TO ROTATABLY ADJUSTING THE LAMP POSITION

TECHNICAL FIELD

This invention relates to an energization indicator, such as a pilot light, for solenoids and in particular to such an indicator which operates on the voltage induced from the solenoid coil.

RELATED INVENTIONS

This application incorporates by reference U.S. Pat. No. 5,287,087.

BACKGROUND OF THE INVENTION

A solenoid energization indicator in the form of a lamp or LED is disclosed in U.S. Pat. No. 5,287,087. However, because of the design, the position of the lamp 70 is haphazard, and often is located in a position that renders its observation difficult. This occurs because the location of the lamp is dependent on the final tightened position of the cylindrical nut 116 which holds the encapsulated solenoid coil assembly 52 on the plunger post 8. The nut is threadedly engaged with the post, or rather with the plunger stop 34 which is part of the post, and is rotated to a tightened position on the stop urging the coil assembly 52 against the clamp plate 64. The exact rotated position of the lamp 70 is thus dependent on the pitch of the threaded engagement of the nut on the plunger post, the thickness of the nut, bobbin 100 and other components, and the tightness with which the nut is turned on to the post. There is no way to position the lamp 70 in the construction disclosed in the '087 patent independently of the nut 116, and accordingly, the lamp may not be positioned in the most desirable location.

SUMMARY OF THE INVENTION

In the present invention the lamp is rotatable on the solenoid independently of the position of the nut for holding the solenoid coil on the plunger post, and thus may be rotatably adjusted to whatever position the inspector desires. This is accomplished by providing a nut or hold-down member for retaining the encapsulated solenoid coil on the plunger post which is provided with a cylindrical stem upon which the bobbin with its associated coil and lamp are rotatably mounted. Thus, the nut may be tightened on the plunger post as desired to hold the solenoid coil in place, and thereafter the bobbin assembly is mounted on the stem and rotated as desired to position the lamp independently of the nut. A cover is provided which encloses and protects the bobbin, coil and lamp, and is provided with a lens which cooperates with the lamp to render it more visible.

BRIEF DESCRIPTION OF THE PREFERRED EMBODIMENT

Figure 1:
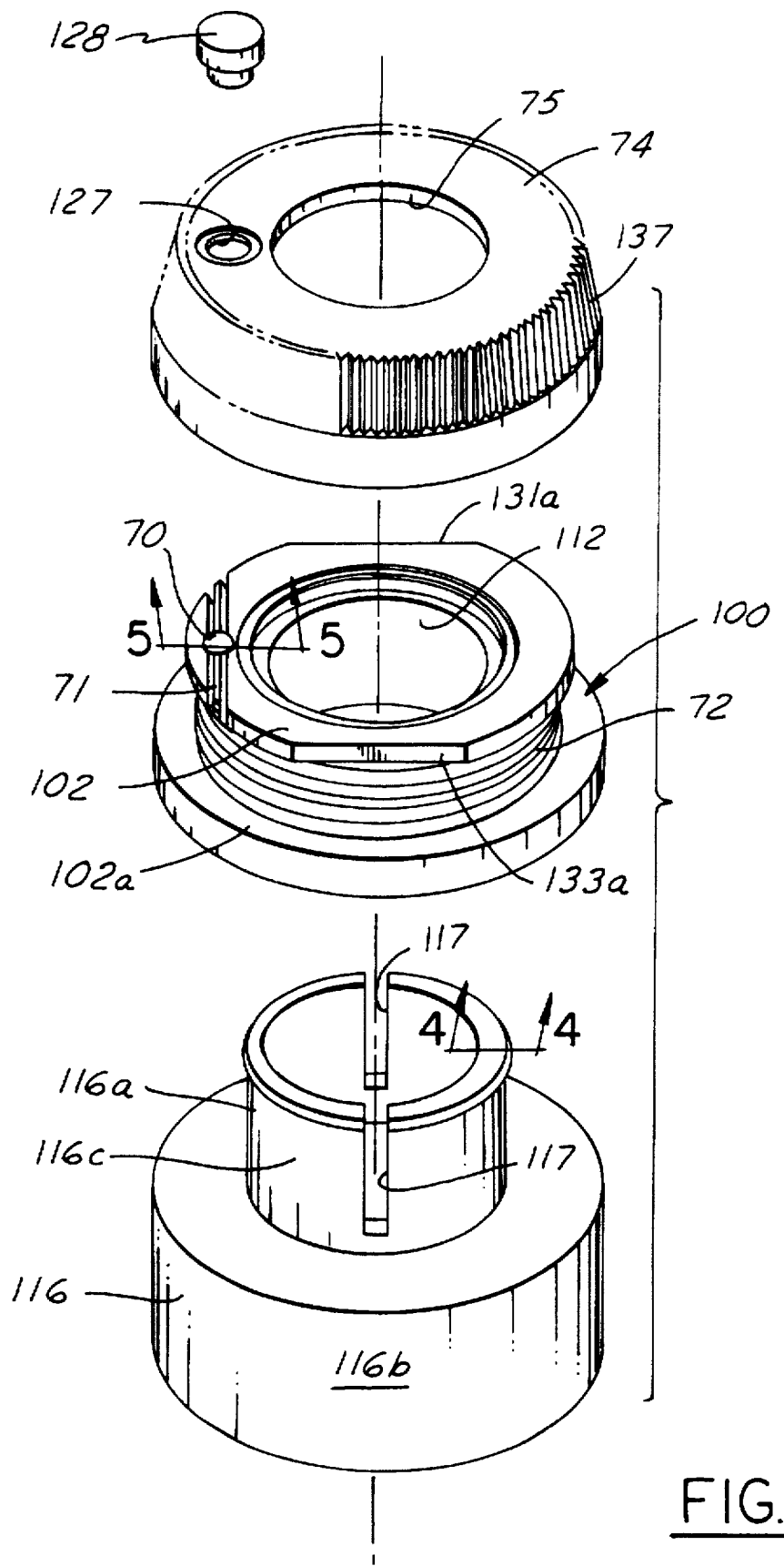
FIG. 1 is an exploded view of the energization indicator.
Figure 2:
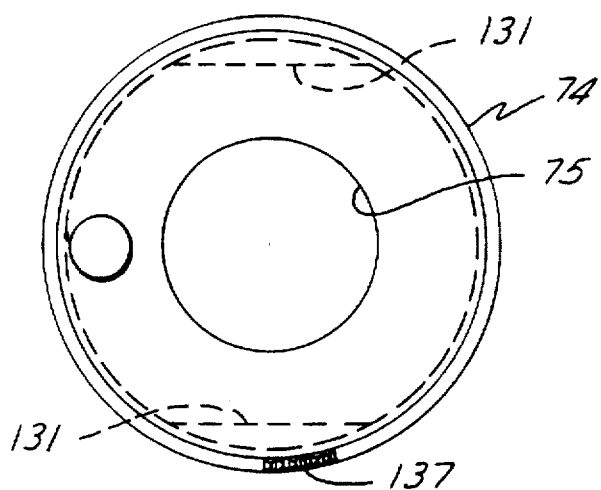
FIG. 2 is a top view of the cover showing the lens.

In the following description the same reference numerals are used whenever appropriate for parts similar to those shown in U.S. Pat. No. 5,287,087. Reference to such patent should be made in following this description.

In the drawings an electrically operable signaller 70 is shown in the form of an electric lamp, such as an LED. A signaller coil 72 electrically connected to the signaller or lamp is operable to activate the signaller when the magnetic flux from coil assembly 54 of the solenoid upon which the indicator is mounted, sweeps the coil 72.

This improved solenoid energization indicator includes a hold-down member 116 which may be telescoped over the plunger post 42. A bobbin assembly is rotatably mounted on the hold-down member and comprises a bobbin 100, a signaller coil 72, an LED 70 and a cover 74.

Figure 3:
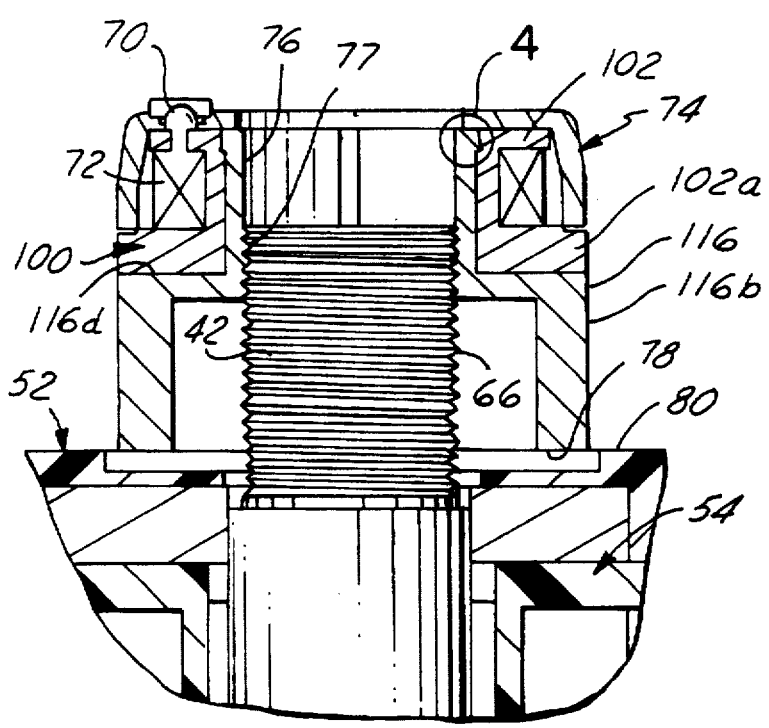
FIG. 3 is a vertical cross-sectional view through the indicator mounted on a solenoid.
Figure 5:
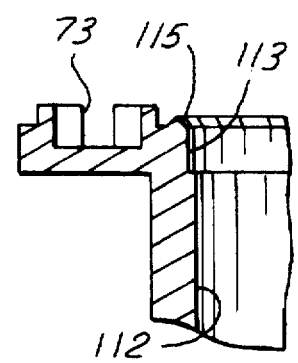
FIG. 5 is a cross-sectional view taken on the line 5—5 of FIG. 1.

The hold-down member may be an injection molded plastic part comprising a pair of integral, coaxial, cylindrical sleeve-like portions 116a and 116b. Portion 116a has an external cylindric mounting surface 116c and a transverse slot 117 enabling the sleeve to be radially inwardly flexed to permit the bobbin assembly to be telescoped thereover and seated thereon against mounting surfaces 116c and 116d, as shown in FIG. 3.

Figure 4:
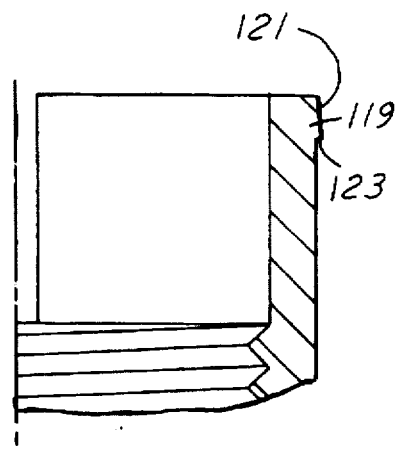
FIG. 4 is a cross-sectional view taken at the circle 4 of FIG. 1.

The distal end of sleeve 116a is provided with a circumferential lip or detent 119 having a tapered exterior surface 121 and a shoulder 123, all best shown in FIG. 4. As the cylindrical bore 112 of bobbin 100 is pressed against the tapered surface of lip 119 it cams the sleeve inwardly to allow the bobbin to snap over the distal end of the of the sleeve 116a to be held thereon by the shoulder 123. The bore 112 of the bobbin has a countersunk portion 113 terminating at the upper end in a chamfered surface 115 against which the lip surface 123 bears. Because of the taper of these two surfaces the parts may be pulled apart axially without breaking them if enough force is exerted.

The hold-down member and the bobbin assembly have cooperating portions for holding the bobbin assembly in the position to which it is rotated on the hold-down member. In this regard, the slot 117 enables the diameter of the bore 112 of the bobbin to be sized slightly smaller than the diameter of the mounting surface 116c so that there is slight interference fit therebetween, whereby the mounting surface 116c of the hold-down member will press outwardly against the bore 112 to hold the bobbin in a position to which it has been rotated on the member 116.

The hold-down member sleeve-like portion 116b has a lower end surface 78 adapted to bear against the upper surface 80 of the solenoid coil assembly 52 to hold the coil assembly on the plunger post 42. To this end, the bore 76 of the hold-down member is threaded as at 77 to threadedly engage the external threads 66 of the plunger post. Thus, upon tightening the hold-down member on the post against the solenoid coil assembly surface 80, the coil assembly is held tightly on the plunger post.

The bobbin 100 which may also be an injection-molded plastic part, has a pair of axially opposed flanges 102 and 102a between which is wrapped an electrically conductive signaller coil 72. Flange 102 has chordal slot 71 bisected by an LED receiving aperture 73 sized to receive and hold the LED 70. The slot 71 allows a flexing of the bobbin flange to grip the LED. The coil 72 is wired in a conventional fashion to the LED to energize the same as a flux from the solenoid coil assembly 52 sweeps the coil.

To cover and protect the signaller coil and LED, a cover 74 of suitable plastic material, and of generally cup-shaped configuration, having a central aperture 75, is telescoped down over the bobbin and hold-down member. The aperture 75 provides a passageway from outside the solenoid to the upper end of the plunger post 42. An aperture 127 laterally offset from the centerline of the cover, is adapted to receive a lens 128 to cover and protect the LED and magnify its emitted light. The cover 74 may be sonically welded to the bobbin flange 102 to hold the parts together, and the inside of the cover may be provided with a pair of diametrically opposed shoulders 131 and 133 adapted to cooperate with flats 131a and 133a on the flange 102 so that upon rotation of the cover, the bobbin will rotationally move with it. The periphery of the cover may be knurled or roughened as at 137 to facilitate rotation of the cover and bobbin and LED, to enable a workman to position the LED rotationally as desired.

It will be noted that unlike the structure shown in U.S. Pat. No. 5,287,087, where the position of the LED was determined by the position of the hold-down nut 116, in the present arrangement the position of the LED is independent of the rotated position of the hold-down member 116. This is made possible by having the bobbin 100, coil 72 and associated LED integrated into a unitary assembly which is mounted on the hold-down member for rotation relative thereto rather than with it.

What is claimed:

1. An energization indicating lamp for use with a solenoid having an encapsulated coil assembly containing a solenoid coil and an aperture extending axially through the coil and opening through opposite ends of the assembly for mounting on a solenoid plunger post having an externally threaded end, comprising:

a hold-down member for telescoping over the solenoid plunger post and having a threaded bore for engaging the threaded end of the post and rotatably tightenable thereon against the encapsulated coil assembly to hold the same on the post;

said hold-down member having an external cylindric mounting surface;

a bobbin assembly having a bobbin with a coil and a lamp fixedly mounted thereon and with said lamp electrically connected to the coil;

said bobbin assembly having a cylindrical bore for reception over the hold-down member relative to the hold-down member for rotatable positioning of the bobbin assembly on the hold-down member independently of the rotated position of the hold-down member to locate the lamp as desired on the solenoid; and said hold-down member and the bobbin assembly having cooperating portions for holding the assembly in the position to which it is rotated.

2. The invention defined by claim 1 wherein a cover encloses and protects the bobbin assembly with a portion of the cover exposing the lamp for observation.

3. The invention defined by claim 2 wherein the cover is fixed to the bobbin assembly and externally configured for manual grasping and rotating to rotatably position the bobbin assembly and lamp.

4. The invention defined by claim 2 or 3 wherein the portion of the cover exposing the lamp comprises a lens.

5. The invention defined by claim 1 wherein the hold-down member includes a cylindrical stem defining said external cylindric mounting surface and said cooperating portions include a detent on the stem for retaining the bobbin assembly on the hold-down member.

* * * * *